United States Patent Office 3,492,349
Patented Jan. 27, 1970

3,492,349
DI-LOWER ALKYL-ALKOXY- AND HYDROXYACETANILIDES
Frank Peter Doyle, Beech Fell, The Downs, Givons Grove, near Leatherhead, Surrey, England, and Richard Allen Baxter, 6 Vicarage Fields, Ruabon, Wrexham, Denbighshire, England
No Drawing. Filed Nov. 28, 1966, Ser. No. 597,213
Claims priority, application Great Britain, Nov. 30, 1965, 50,717/65
Int. Cl. C07c 97/00, 103/32; A61k 27/00
U.S. Cl. 260—562          6 Claims

ABSTRACT OF THE DISCLOSURE

Novel aminophenol derivatives having analgesic and antipyretic activity are provided responding to the formula:

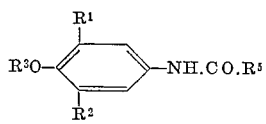

wherein $R^1$ and $R^2$ are the same or different and each is lower alkyl, $R^3$ is hydrogen or lower alkyl and $R^5$ is hydrogen or lower alkyl.

---

This invention relates to pharmaceutical compounds, and is particularly concerned with a novel class of compounds having analgesic and anti-pyretic properties.

We have found a novel class of aminophenol derivatives which have potent analgesic and antipyretic properties and which are of value for oral or parenteral treatment of man in conditions requiring analgesic therapy, for example in the treatment of the common cold, chills, influenze, headaches and nerve and rheumatic pains.

According to the present invention there are provided new compounds of the general formula:

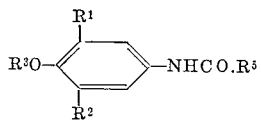

(I)

where $R^1$ and $R^2$ are the same or different and each is a hydrocarbon group or lower alkoxy group, $R^3$ is a hydrogen atom or a hydrocarbon group, and $R^5$ is a hydrogen atom or a lower alkyl group.

The preferred class of compounds are those of the general Formula I in which $R^1$ and $R^2$ are both lower alkyl groups or methoxy groups, $R^3$ is a hydrogen atom or a lower alkyl group and $R^5$ is a methyl group.

In the above definition the term lower alkyl, including its occurrence in lower alkoxy, means a straight or branched alkyl group having from 1 to 6 carbon atoms.

The compounds of Formula I may be presented orally or parenterally and are preferably incorporated into a pharmaecutical formulation for such administration, either as the sole active ingredient or together with other pharmacologically active ingredients. For example the oral preparations may be tablets, pills, powders, capsules, granules, suspensions, dispersions, solutions or emulsions which may contain diluents, binders, dispersing agents, surface active agents, flavouring agents, lubricating agents, colouring agents, coating materials, solvents, thickening agents or any other pharmaceutically acceptable additives where appropriate. The injectable form may be a substantially aqueous or non-aqueous solutioin, suspension or emulsion in a pharmaceutically acceptable liquid or mixture or liquids which may contain bacteriostats, antioxidants, buffers, solutes to render the formulation isotonic with the blood, thickening agents, suspending agents, or any other pharmaceutically acceptable additives where appropriate. Such injectable formulations should be made sterile and may be presented in unit dose forms such as ampoules or disposable injection devices or in multi-dose forms such as bottle from which the appropriate dose may be withdrawn. The preferred formulations are solid compositions for oral administration which may contain one or more additional pharmacologically active ingredients for example acetylsalicylic acid, caffeine, or codeine.

Thus in another aspect the present invention provides pharmaceutical formulations containing a compound of Formula I and a method for preparing such formulations which comprises incorporating the compound of Formula I into the formulation by conventional techniques.

The following pharmacological data illustrates the activity of the compounds. Table I compares the activity of 3,5 - dimethyl - 4 - ethoxyacetanilide with phenacetin and paracetamol, two analgesics which are widely used in similar circumstances to those for which the compounds of Formula I are intended.

The analgesic activity was determined in mice using the phenylquinone writhing technique of Seigmund, Cadmus and Lu (Proc. Soc. Exp. Biol., 1957, 95, 729). The potency of Compound A was determined one hour after administration and the potencies of paracetamol and phenacetin ½ hour and one hour after administration, the animals being starved 18 hours prior to oral dosage.

TABLE 1

| Dose (mg./kg.) | Compound A 1 hr. | Paracetamol ½ hr. | Paracetamol 1 hr. | Phenacetin ½ hr. | Phenacetin 1 hr. |
|---|---|---|---|---|---|
| 25 | 30 | | | | |
| 30 | | | | 34 | |
| 50 | 43 | 45 | | | |
| 90 | | | | | 30 |
| 100 | | | | 60 | |
| 120 | 57 | 61 | 38 | | |
| 180 | | | | | 45 |
| 200 | | | 44 | | |
| 300 | | 76 | | 85 | |
|  | | | 77 | | 72 |

The results showed 3,5-dimethyl-4-ethoxyacetanilide to be longer acting than phenacetin and paracetamol since its $ED_{50}$ at 1 hour after administration was approximately 70 mg./kg. as opposed to 125 mg./kg. for phenacetin and about 180 mg./kg. for paracetamol. Phenacetin at ½ hour had an $ED_{50}$ of approximately 70 mg./kg., and paracetamol has activity of the same order.

The acute toxicity of 3,5-dimethyl-4-ethoxyacetanilide was approximately 2000 mg./kg., which makes the compound less toxic than phenacetin.

Other compounds of Formula I are compared in Table 2 which compares $ED_{50}$s after ½ hour.

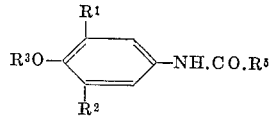

TABLE 2

| Compound | | | | Phenylquinone writhing test oral dose in mg./kg., mice |
|---|---|---|---|---|
| $R^1$ | $R^2$ | $R^3$ | $R^5$ | |
| $CH_3$ | $CH_3$ | $C_2H_5$ | $CH_3$ | 70 |
| $CH_3$ | $CH_3$ | $CH_3$ | $CH_3$ | 230 |
| $CH_3$ | $CH_3$ | $n-C_3H_7$ | $CH_3$ | 86 |
| $CH_3$ | $CH_3$ | $i-C_3H_7$ | $CH_3$ | 170 |
| $CH_3$ | $CH_3$ | $n-C_4H_9$ | $CH_3$ | 1500 |
| $CH_3$ | $CH_3$ | H | $CH_3$ | 130 |
| $t-C_4H_9$ | $t-C_4H_9$ | H | $CH_3$ | 46 |

The dose of the compound of Formula I to be administered to man will vary somewhat according to which compound is used, the route of administration and whether the compound is administered alone or with other analgesics. However, comparing the compounds with phenacetin which has an $ED_{50}$ of about 70 mg./kg. in mice after ½ hour and which is used in man at doses of 150–600 mg. (or 2–10 mg./kg. man), one can expect the useful dose to be in the range of 50–1000 mg. As shown above the compounds tend to have a more prolonged action than phenacetin and due allowance must be given for this as well as for any variations in dose due to individual differences in sensitivity to the drug and due to variation in body weight.

The present invention also includes a process for the preparation of compounds of Formula I which comprises reacting an aniline of Formula II

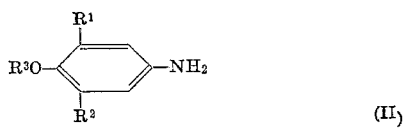

with an acylating agent of formula $R^5CO.Q$ where $R^1$, $R^2$, $R^3$ and $R^5$ have the meanings as defined above for general Formula I and Q is a functional group for acylating primary amines such as a halogen atom (i.e. $R^5CO.Q$ is an acyl halide) an azido group, an acyloxy or alkoxycarbonyloxy group (i.e. $R^5CO.Q$ is an acid anhydride or mixed anhydride) or a 1-imidazolyl or N,N'-disubstituted isoureido group (i.e. $R^5CO.Q$ is an intermediate formed from the corresponding carboxylic acid and a condensing agent such as carbonyldiimidazole or dicylcohexylcarbodiimide). The preferred method is to react the aniline with the appropriate acid anhydride of formula $R^5CO.O.COR^5$. No heating is required but more generally the reaction may be conducted at temperatures in the range of for example 0°–50° C. and the reaction mixture may if desired be heated to higher temperatures than this towards the end of the reaction period.

If $R^3$ is a hydrogen atom the acylating conditions must be kept sufficiently mild so that the amino group but not the hydroxy group is acylated. Thus excess heating and high concentrations or large excesses of acylating agent would be avoided.

If $R^3$ is to be a hydrocarbon group it is possible to start with the appropriate p-hydrocarbonoxy-aniline and acylate it in one step as described above, or it is possible to start with the p-hydroxy-aniline and acylate it as described above and then convert the hydroxy group to a hydrocarbonoxy group. This second step may be brought about by the reaction of a hydrocarbon halide, preferably the iodide or bromide and especially the iodide, or some other functionally equivalent reactive ester such as an organic sulphonic ester or a sulphate. In practice the reaction is normally carried out in the presence of an acid-acceptor. This can be for instance a tertiary amine but is preferable an inorganic material, for instance an alkali metal carbonate, especially potassium carbonate. Thus in typical examples of the preferred procedure the p-hydroxy-N-acylaniline will be heated with an alkyl, alkenyl, aralkyl or aryl iodide in a solvent in the presence of potassium carbonate.

Therefore, the process of this invention includes the additional optional step where appropriate of converting the hydroxy compound to its hydrocarbon derivative.

The aniline starting materials of Formula II for the above process are conveniently prepared by the reduction of a nitro or nitroso benzene or benzoquinone-4-oxime. This reduction may be effected using any one of a number of well known reducing agents. Thus for example to reduce a nitroso benzene one may use hydrosulphides or hydrosulphites or nascent hydrogen which itself may be generated by the action of an acid on a metal or electrolytically, or molecular hydrogen in conjunction with a hydrogenation catalyst. When compounds in which $R^3$ is a hydrocarbon group are to be prepared the nitrobenzene starting material to reach the aniline of Formula II may be synthesized as follows. A p-halonitrobenzene such as the p-F-nitrobenzene is treated with the sodium derivative of the hydroxyhydrocarbon (e.g. sodium alkoxide) or alternatively the 4-nitrophenol is converted to its alkali metal salt and then treated with the hydrocarbon halide.

The following examples illustrate the invention further. In cases where the starting materials are not themselves readily available the preparation of these compounds is also included.

EXAMPLE 1

Preparation of 3,5-dimethyl-4-ethoxyacetanilide

1st stage — Preparation of 4-amino-2,6-xylenol. — A mixture of 150 cc. of glacial acetic acid and 200 cc. of water was added over a period of 3 hours at a temperature of 0–5° C. to a solution of 91.5 grams of 2,6-xylenol, 54.6 grams of sodium nitrite and 30 grams of sodium hydroxide in 300 cc. of water. The mixture was stirred for a further hour, and the solid product, 4-nitroso-2,6-xylenol, was collected by filtration of the reaction mixture and washed with water.

The 4-nitroso-2,6-xylenol was then added with stirring to 1200 cc. of a solution of sodium hydroxide containing 10 grams NaOH per 100 cc. The solution was filtered to remove a small amount of insoluble material, and to the stirred filtrate sodium hydrosulphite was added in small portions until the solution was decolourised. A total of 240 grams of sodium hydrosulphite was used. The cooled solution was then neutralised by the addition of hydrochloric acid, thereby precipitating 4-amino-2,6-xylenol as a white solid. The 4-amino-2,6-xylenol was collected by filtration, washed with water and then resuspended in 600 cc. of water.

2nd stage — Preparation of 3,5-dimethyl-4-hydroxyacetanilide. — 120 cc. of acetic anhydride were added during 15 minutes to the stirred suspension at room temperature, and stirring at this temperature was continued for a further hour before finally boiling the solution for 15 minutes. On cooling 3,5-dimethyl-4-hydroxyacetanilide crystallised from the solution, and was collected by filtration, washed with water and recrystallised from aqueous ethanol, giving 78.5 grams of a product having a melting point of 160–162° C.

3rd stage — Preparation of 3,5-dimethyl-4-ethoxyacetanilide. — A mixture of 78.5 grams of 3,5-dimethyl-4-hydroxyacetanilide, 330 grams of potassium carbonate, 133 c. of ethyl iodide and 400 cc. of acetone was boiled under reflux with stirring for 24 hours. The bulk of the acetone was then removed by distillation, and 800 cc. of water were added to the residue, whereupon 3,5-dimethyl-4-ethoxyacetanilide separated as a white crystalline solid. This was collected by filtration, washed with water, and recrystallised from aqueous ethanol giving 71.0 grams of product having a melting point of 134.5–135° C. (Found: C, 69.91; H, 8.43; N, 6.89; $C_{12}H_{17}NO_2$ requires C, 69.57; H, 8.21; N, 6.76%).

EXAMPLE 2

3,5-dimethyl-4-n-propoxy-acetanilide

A mixture of 3,5-dimethyl-4-hydroxy-acetanilide (17.9 g.=0.1 mole), 15 g. n-propyl bromide, 75 g. $K_2CO_3$, 100 ml. acetone, and 0.1 g. NaI is boiled under reflux, with good agitation, for 16 hours. Most of the acetone is then removed by distillation before quenching the residue with water. The solid which separates out is filtered off and dried. Yield=22.5 g., M.P. 122–123° C.

After two crystallisations from aqueous ethyl alcohol a white crystalline solid is obtained, M.P. 122.5–123.5° C.

$C_{13}H_{19}NO_2$ requires C, 70.59; H, 8.60; N, 6.33. Found: C, 71.00; H, 8.46; N, 6.47.

EXAMPLE 3

3,5-dimethyl-4-iso-propoxy-acetanilide

By the same procedure as used in Example 2 but using iso-propyl bromide in place of n-propyl bromide, the compound 3,5 - dimethyl-4-iso-propoxy-acetanilide was prepared. Crude yield=18.8 g., M.P. 81–86° C. Twice crystallised from aqueous ethyl alcohol, M.P. 99–100° C.

$C_{13}H_{19}NO_2$ requires C, 70.59; H, 8.60; N, 6.33. Found: C, 70.00; H, 8.70; N, 6.40.

EXAMPLE 4

3,5-dimethyl-4-n-butoxy-acetanilide

By the same procedure as used in Example 2 using n-butyl bromide and increasing reflux time to 24 hours. Crude yield=22.3 g., M.P. 121–123° C. Twice crystallised from aqueous ethyl alcohol, M.P. 123–125° C.

$C_{14}H_{21}NO_2$ requires C, 71.49; H, 8.94; N, 5.96. Found: C, 71.74; H, 9.12; N, 5.84.

EXAMPLE 5

Preparation of 3,5-di-t-butyl-4-hydroxy-acetanilide

1st stage — 2,6-di-t-butylbenzoquinone-4-oxime. — As in J. Org. Chem. 1962, 27, 651–643.

A solution of 2,6-di-t-butylphenol (30.0 g.) in ethanol (250 ml.) and hydrochloric acid (20 ml. conc.) is stirred at −5° C., when a solution of sodium nitrite (11.0 g.) in water (50 ml.) is added slowly with good agitation keeping the reaction temperature below 0° C. Stirring is continued for a further 20 mins. and then the mixture is poured into 1,000 ml. ice water. The yellow solid which separates out is filtered off and crystallised from benzene (26 g.) M.P. 228–229° C.

2nd stage — 2,6-di-t-butyl-4-aminophenol (reduction of oxime).—23.5 g. (0.1 mole) 2,6-di-t-butyl-benzoquinone-4-oxime is dissolved in 200 ml. 10% w./v. sodium hydroxide solution and stirred at 90° C. when a concentrated solution of sodium hydrosulphite is added slowly until precipitation of the amine ceases, indicated by a permanent colour change. The white crystalline amine is filtered off, washed with water and dried in a vacuum desiccator, excluding contact with air as far as possible (22.0 g.) M.P. 108–109° C.

3rd stage — 3,5-di-t-butyl-4-hydroxy-acetanilide.—22.1 g. (0.1 mole) 2,6-di-t-butyl-4-aminophenol is suspended in 200 ml. water when 40 ml. acetic anhyride is added subsurface at room temperature. Stirring is continued for 1 hour before raising the temperature and boiling for 5 minutes. The solid which separated out when cold is filtered off and crystallised from aqueous ethyl alcohol, M.P. 174–175° C.

$C_{16}H_{25}NO_2$ requires C, 73.00; H, 9.51; N, 5.32. Found: C, 72.66; H, 9.54; N, 5.29.

EXAMPLE 6

3,5-di-t-butyl-4-ethoxy-acetanilide

By the procedure of Example 2, 3,5-di-t-butyl-4-hydroxyacetanilide was treated with 30 ml. ethyl iodide and refluxed for 60 hours.

The product was twice crystallised from aqueous ethyl alcohol and then had M.P. 181–182° C.

$C_{18}H_{29}NO_2$ requires C, 74.23; H, 9.96; N, 4.81. Found: C, 74.23; H, 9.97; N, 4.91.

We claim:
1. 3,5-dimethyl-4-ethoxyacetanilide.
2. 3,5-dimethyl-4-n-propoxyacetanilide.
3. 3,5-di-t-butyl-4-hydroxyacetanilide.
4. 3,5-dimethyl-4-hydroxyacetanilide.
5. 3,5-dimethyl-4-iso-propoxyacetanilide.
6. 3,5-dimethyl-4-methoxyacetanilide.

References Cited

UNITED STATES PATENTS

| | | | |
|---|---|---|---|
| 2,642,397 | 6/1953 | Morway et al. | 260—562 |
| 2,721,213 | 10/1955 | Mooradian | 260—562 |

FOREIGN PATENTS

| | | |
|---|---|---|
| 172,343 | 7/1965 | U.S.S.R. |

OTHER REFERENCES

Burmistrov et al.: J. Organic Chem. U.S.S.R., vol. 1, pp. 286–88 (February 1965).

Burmistrov et al.: J. Organic Chem. U.S.S.R., vol. 34, pp. 3828–3821 (November 1964).

HENRY R. JILES, Primary Examiner

HARRY I. MOATZ, Assistant Examiner

U.S. Cl. X.R.

424—324